US006479113B2

(12) United States Patent
Yamamoto et al.

(10) Patent No.: US 6,479,113 B2
(45) Date of Patent: *Nov. 12, 2002

(54) COLLAPSIBLE METAL TUBE AND AEROSOL CAN AND METHOD FOR MANUFACTURING COLLAPSIBLE METAL TUBE

(75) Inventors: Yuichi Yamamoto, Ikeda (JP); Kenji Ohnishi, Minoo (JP)

(73) Assignee: Taisei Kako Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/531,539

(22) Filed: Mar. 20, 2000

(65) Prior Publication Data

US 2002/0051855 A1 May 2, 2002

Related U.S. Application Data

(63) Continuation of application No. 09/077,536, filed as application No. PCT/JP97/00377 on Feb. 13, 1997, now Pat. No. 6,096,376.

(30) Foreign Application Priority Data

Oct. 2, 1996 (JP) .............................................. 8-281343
Feb. 5, 1997 (JP) .............................................. 9-37036

(51) Int. Cl.[7] ......................... B29D 22/00; B29D 23/00; B32B 1/08

(52) U.S. Cl. .................... 428/35.3; 428/35.2; 428/35.4; 428/35.7; 428/35.8; 428/35.9; 428/36.7; 428/36.91; 428/461; 428/462; 428/516; 428/517; 428/521; 428/523; 220/666

(58) Field of Search ............................... 428/35.2, 35.3, 428/35.4, 35.7, 35.8, 35.9, 36.7, 36.91, 461, 462, 516, 517, 519, 521, 523; 220/586, 62.22, 666, 915; 206/0.6, 0.8

(56) References Cited

U.S. PATENT DOCUMENTS

| | | | | | |
|---|---|---|---|---|---|
| 3,503,539 | A | | 3/1970 | O'Donnell | 222/402.1 |
| 4,064,293 | A | | 12/1977 | Nicklas | 118/DIG. 10 |
| 4,253,580 | A | * | 3/1981 | Doi et al. | 215/228 |
| 4,418,841 | A | | 12/1983 | Eckstein | 222/107 |
| 4,539,259 | A | | 9/1985 | Zuscik | 222/107 |
| 4,693,395 | A | * | 9/1987 | Tavss et al. | 222/107 |
| 5,203,379 | A | | 4/1993 | Holoubek et al. | 222/107 |
| 5,204,181 | A | * | 4/1993 | Suzuki et al. | 428/349 |
| 5,419,466 | A | * | 5/1995 | Scheindel | 222/389 |
| 5,512,365 | A | * | 4/1996 | Miyazawa et al. | 428/332 |
| 6,096,376 | A | * | 8/2000 | Yammamoto et al. | 427/181 |

FOREIGN PATENT DOCUMENTS

| | | |
|---|---|---|
| JP | 52-94288 | 8/1977 |
| JP | 2-123175 | 5/1990 |
| JP | 4-100871 | 4/1992 |
| JP | 4-327143 | 11/1992 |

* cited by examiner

*Primary Examiner*—Harold Pyon
*Assistant Examiner*—Michael C. Miggins
(74) *Attorney, Agent, or Firm*—Wenderoth, Lind & Ponack, L.L.P.

(57) ABSTRACT

A collapsible metal tube, comprising: a metal body portion susceptible of plastic deformation, the body portion being sealed at one end; a shoulder portion and a mouth/neck portion connected to the other end of the body portion; and a resin film provided on the inside wall surface of the body portion, the resin film comprising a metal-adhesive thermoplastic resin layer formed by spray-coating the inside wall surface of the body portion with a dispersion of fine spherical particles consisting of a metal-adhesive thermoplastic resin and then heating to integrate the particles. The resin film formed on the inside of the collapsible metal tube is reliable because it is a dense resin film virtually devoid of pinholes, excellent in elongation at break, and free from cracking when folded or deformed, and is excellent in ability of protecting the metal body portion and the contents.

13 Claims, 7 Drawing Sheets

COLLAPSIBLE METAL TUBE AND AEROSOL CAN AND METHOD FOR MANUFACTURING COLLAPSIBLE METAL TUBE

CROSS REFERENCE TO RELATED APPLICATION

This application is a continuation of Ser. No. 09/077,536 filed Jun. 1, 1998, now U.S. Pat. No. 6,096,376 which is a 371 of PCT/JP97/00377 filed Feb. 13, 1997.

FIELD OF THE INVENTION

The present invention relates to a collapsible metal tube and aerosol can whose inside wall surface is covered with a highly reliable dense resin film that is virtually devoid of pinholes, excellent in elongation at break, and devoid of cracks or other defects caused by folding and other types of deformation; and to a method for manufacturing a collapsible metal tube.

DESCRIPTION OF THE RELATED ART

Collapsible metal tubes from which a paste stored therein is squeezed when the body portion is subject to plastic deformation by pressure have been used to store various foodstuffs, drugs, cosmetics, and the like.

A collaspsible metal tube comprises a body portion composed of metal walls susceptible of plastic deformation, and a shoulder portion and mouth/neck portion connected to one end of the body portion. The other end of the body portion of the collapsible metal tube is sealed by folding and tightening or the like, and the mouth/neck portion is openably closed with a cap.

In such collapsible metal tubes, the metal component of the body portion, or the outside air and moisture (water vapor) entering bit by bit over a long period of time through the fold formed at one end should be prevented from spoiling the contents, while the contents should be prevented from corroding the metal body portion. It has already been proposed in the past to use as such collapsible metal tubes so-called double-tube collapsible tubes, which is obtained by inserting a resin tube having an essentially complementary shape into a metal tube open at one end, packing the contents therein through the open end of the resin tube, and sealing the open end by applying pressure and heat through the metal tube to heat-seal. Problems with such a double-tube type of collapsible metal tube are that a large number of operations are required, it is difficult to align the outer metal tube or cylinder and the inner resin cylinder and to adjust the difference in the dimensional tolerance therebetween, and so forth. In addition, it leads to an inevitable increase in production costs to manufacture such tubes, and they can therefore be used in a very limited applications. Another disadvantage of such collapsible tubes is that it is difficult to remove the contents completely because the internally mounted resin tube tends to restore its original shape due to its thickness and elasticity.

It has also been proposed to use collapsible metal tubes in which a thermosetting resin coating material is sprayed on the inside wall surface of the body portion, and the resulting layer is heated and cured to obtain a thermosetting resin coating such as an epoxy phenolic resin film or a phenol butyral resin film. In such thermoplastic resin films, however, it is virtually impossible to prevent both the formation of pinholes and the formation of cracks by folding and other types of deformation.

That is, thermosetting resins are commonly rigid and are likely to be suffered from cracks or the like when subjected to folding or other types of deformation. This tendency to form cracks is even more pronounced when the film thickness is 15 μm or greater. An additional problem is that coating defects are formed by air bubbles and the like in thermosetting resin coatings during the formation of coatings, and pinholes tend to form in the resin films obtained by heating and curing such films. The pinhole formation becomes even more pronounced when an attempt is made to significantly reduce the thickness of a thermosetting resin film in order to prevent cracking. The pinhole formation can be reduced to some extent by reapplying the coating, but repeated application complicates the coating formation process, and when the number of application cycles is sufficient to achieve a complete elimination of pinholes, the total film thickness results in 20 μm or greater. It is therefore difficult to perform a sufficient number of application cycles in order to prevent the formation of coating defects while keeping the film thickness within a range to cause few cracks.

In other words, commonly used collapsible tubes with thermosetting resin coatings having a thickness of 5 to 15 μm are such that (1) it is difficult to prevent pinholes from forming in the resin films and that (2) when the thickness of a resin film is increased to 20 μm or greater in order to prevent pinhole formation, it is impossible to prevent cracks from being formed by folding or other types of deformation, with the result that the quality of the contents or metal body portions declines in both cases. The thermosetting resin coatings of conventional collapsible tubes still have a room for being improved in their ability to protect the contents or metal body portions.

In the collapsible metal tubes having thermosetting resin films on the inside wall surfaces of their body portions, it is necessary to coat the inside wall in the area of the open end with an end sealant such as a rubber latex in order to preserve the airtightness during the stage following the heating and curing for obtaining the thermosetting resin film and the subsequent introduction of the contents through the open end, that is, during the stage when the open end (cuff) is folded and tightened. The resulting disadvantage of such collapsible metal tubes is that the folding and tightening processes are too complicated to keep productivity.

Similar to collapsible metal tubes, aerosol cans serve as containers that have body portions consisting of metal walls. Normally, an aerosol can has a bottomed cylindrical body portion consisting of metal walls, a shoulder portion and neck portion connected to the upper end of the body portion, and a valve assembly provided to the neck portion. A drug or cosmetic that is stored in the aerosol can together with pressurized gas or another propellant is ejected outside through the valve assembly by the action of the valve assembly.

In such aerosol cans as well, the metal components of the body portion should be prevented from spoiling the contents while for the contents should be prevented from corroding the metal body portion. In the past, resin films consisting of epoxy phenolic resins, epoxy urea resins, vinyl organoresins, fluororesins (polytetrafluoroethylene, polyperfluoroethylene, and the like), polyamides (nylon-12 and the like), polyesters (polyethylene terephthalate), polyethylenes and the like were formed on the inside surfaces of body portions and bottom portions.

Even in such resin films, however, coating defects formed due to the air bubbles and the like present in the films during the formation of coatings, and pinholes are apt to form in the resulting resin films. The pinhole formation can be reduced to some extent by repeatedly applying the coating, but repeated application is disadvantageous in that it complicates the coating formation process and lowers the productivity.

The present invention has been accomplished in order to overcome the aforementioned disadvantages associated with prior art. An object of the present invention is to provide a collapsible metal tube whose inside wall surface is coated with a highly reliable dense resin film that is virtually devoid of pinholes, excellent in elongation at break, devoid of cracks or other defects caused by folding and other types of deformation, and excellent in ability to protect the metal body portion and the contents; and to provide a method for manufacturing such a tube.

Another object of the present invention is to provide an aerosol can whose inside wall surface is coated with a dense resin film that is virtually devoid of pinholes and that has an excellent ability to protect the metal body portion and the contents.

Yet another object of the present invention is to provide an apparatus capable of performing a method for manufacturing the collapsible metal tube pertaining to the present invention.

DESCRIPTION OF THE INVENTION

The collapsible metal tube according to the present invention comprises:

a metal body portion plastically deformed without difficulty, said body portion being sealed at one end, a shoulder portion and a mouth/neck portion connected to the other end of the body portion, and a resin film provided on the inside wall surface of the body portion, said resin film comprising a metal-adhesive thermoplastic resin layer formed by spray-coating the inside wall surface of the body portion with a dispersion of fine spherical particles of a metal-adhesive thermoplastic resin and then heating to fuse these particles.

The resin film of the collapsible metal tube according to the present invention is not limited in terms of its layer structure as long as this film has a metal-adhesive thermoplastic resin layer. The resin film, therefore, comprises at least one such metal-adhesive thermoplastic resin layer. It is also possible for the resin film to comprise a metal-adhesive thermoplastic resin and a thermoplastic resin layer capable of adhering to this metal-adhesive thermoplastic resin layer, or a thermosetting resin layer in contact with the surface of the metal body portion and a metal-adhesive thermoplastic resin layer formed on the inside of the thermosetting resin layer.

The method for manufacturing the collapsible metal tube according to the present invention comprises:

spray-coating a dispersion of fine spherical particles of a metal-adhesive thermoplastic resin on the inside wall surface of a metal body portion open at one end of a collapsible tube comprising the metal body portion plastically deformed without difficulty, and a shoulder portion and a mouth/neck portion connected to the other end of the body portion in this order, to form a coating of uniform thickness and heating the coating to fuse the fine spherical particles of the resin, thereby forming a metal-adhesive thermoplastic resin layer.

The coating apparatus according to the present invention is an apparatus capable of manufacturing the collapsible metal tube described above which comprises:

a coating unit equipped with a nozzle having at its tip a coating material spray orifice for spraying the inside wall surface of a cylindrical article open at least one end with a coating material, said nozzle being capable of moving in the direction of the major axis of the metal cylinderical article to be coated; and a drive unit for making a relative motion between the coating material spray orifice of the coating unit and the inside wall surface of the cylindrical article in such a manner that the inside wall surface of the cylindrical article moves around the spray orifice in a direction of approximately the circumferential direction.

The aerosol can according to the present invention comprises: a bottomed cylindrical body portion; a shoulder portion and a mouth/neck portion connected to the other end of the body portion; a valve assembly provided to the mouth/neck portion; and a resin film comprising a metal-adhesive thermoplastic resin layer, said resin film being prepared by spray-coating the inside wall surface of the body portion with a dispersion of fine spherical particles of a metal-adhesive thermoplastic resin and then heating and fusing these particles.

DETAILED DESCRIPTION OF THE PREFERRED EMBODIMENTS

The collapsible metal tube according to the present invention comprises a metal main body constituting the outer shell portion of the tube, and a resin film having a metal-adhesive thermoplastic resin layer formed by a prescribed method on the inside wall surface of the body portion of the main body. A preferred embodiment of the collapsible metal tube of the present invention will now be described with reference to the accompanied drawings.

As used herein, the term "a layer" constituting a resin film refers both to a layer formed by a single coating cycle and to a layer formed by plural coating cycles using the same resin, and the term "two adjacent layers" refers to layers formed from two mutually different resins. It should be noted, however, that the term "adjacent layers" includes cases in which the interface between the two layers is not distinct, and does not necessarily means that the two are firmly bonded.

Figures 1A, 1B, 1C:
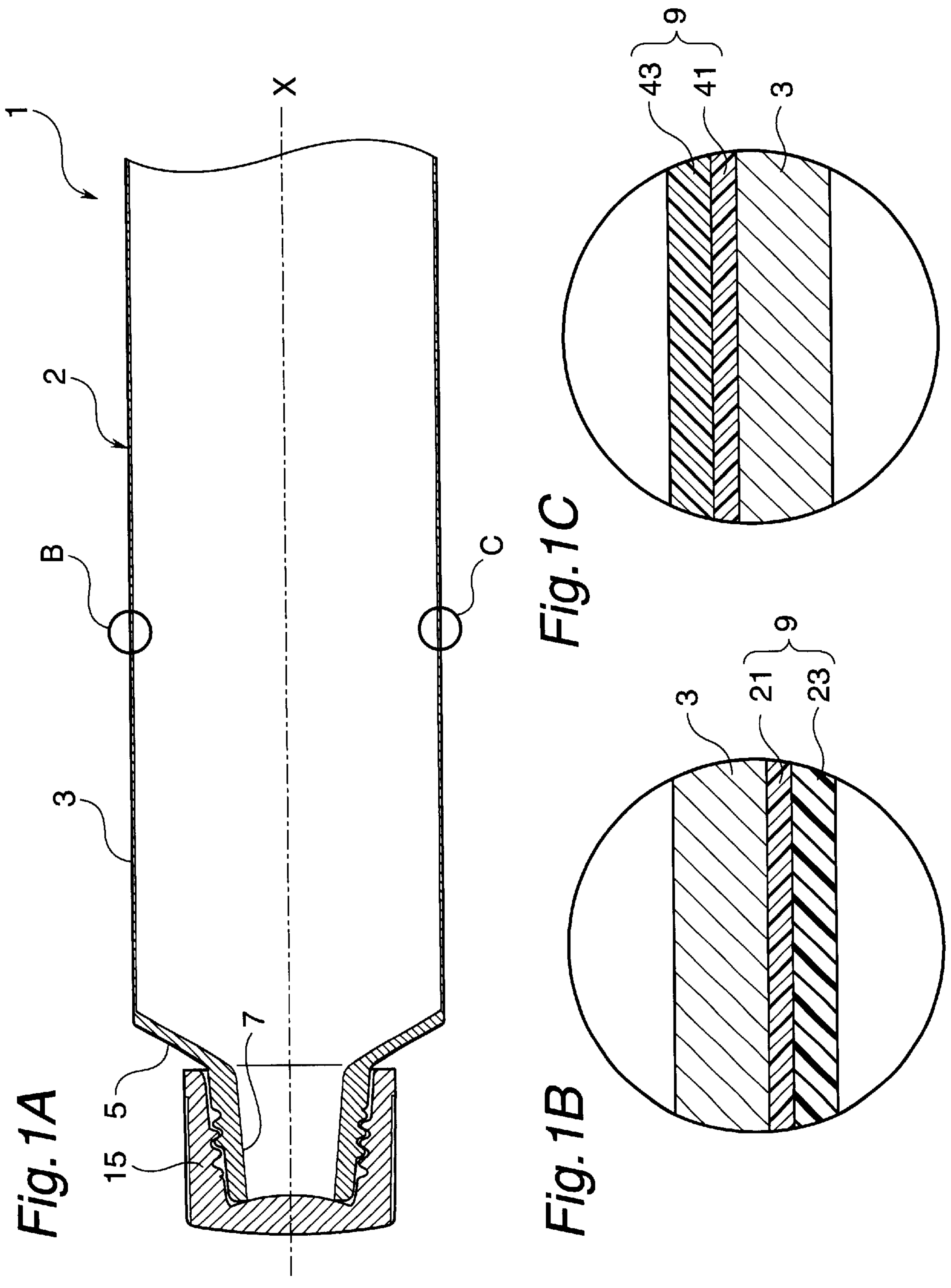
FIG. 1A is a schematic longitudinal section of a preferred embodiment of the collapsible metal tube according to the present invention.
FIG. 1B is a partially enlarged cross section depicting the layer structure of the resin film thereof.
FIG. 1C is a partially enlarged cross section depicting another preferred-embodiment of the layer structure of the resin film.

FIG. 1A is a schematic longitudinal section of a collapsible tube depicting a preferred embodiment of the present invention, and FIG. 1B is a partially enlarged schematic depicting the resin film layer structure of the collapsible tube of the embodiment according to the present invention. As shown in the drawings, the collapsible tube 1 comprises a metal main body 2 consisting of a metal body portion 3, and a mouth/neck portion 7 and a shoulder portion 5 connected to an end of the body portion 3, and a resin film 9 formed on the inside wall surface of the body portion 1. The tube is a container for storing highly viscous liquids or pastes.

An external thread is provided around the outside of the mouth/neck portion 7, and this external thread is detachably engaged with the internal thread inside the cap of the collapsible tube 1.

In the metal main body 2 of the collapsible tube 1, the body portion 3 consists of a plastically deformable wall thickness and material. A sheet or foil material obtained by extending under pressure a metal selected from among aluminum, aluminum alloys, tin, tin alloys, lead, and the like can be exemplified as a material for the body portion 3. In the present embodiment, the mouth/neck portion 7 and the shoulder portion 5 connected to one of the ends of the body portion 3 are made from the same material as that of the body portion 3, but the present invention does not impose any particular limitations on the material of the shoulder portion 5 and the mouth/neck portion 7.

In many applications, the material of the body portion 3 is preferably aluminum or an alloy thereof, and more preferably aluminum metal. For a variety of reasons, however, other metals (lead, for example) are sometimes used to advantage. For example, lead is a metal that is soft, withstands repeated bending, and can be easily penetrated with a pointed object such as a sewing needle, and the contents can be removed from the tube through the resulting hole by squeezing, pressing, or the like. It is therefore preferable for the main body 2 to be made of lead if the product is not intended for prolonged storage in an environment that induces corrosion in lead.

In the collapsible tube 1 of the present embodiment, the resin film 9 formed on the inside of the metal body portion 3 comprises, especially as shown in FIG. 1B, a metal-adhesive thermoplastic resin layer 21 (undercoat layer) in contact with the body portion 3, and a thermoplastic resin 23 (overcoat layer) that is formed on the inside of the layer 21 and that can be bonded under heat to the adhesive thermoplastic resin 21.

Examples of adhesive thermoplastic resins used to form the metal-adhesive thermoplastic resin layer 21 of the resin film 9 include metal-adhesive polyolefins such as dicarboxylic acid graft-modified polyolefins and unsaturated carboxylic acid graft-modified polyolefins obtained by graft bonding dicarboxylic acid, unsaturated carboxylic acid, and/or other graft monomer to polyolefin backbone polymer; 1-olefin/unsaturated carboxylic acid copolymers obtained by copolymerizing 1-olefin and at least one unsaturated carboxylic acid; and alkali metal salts and alkaline-earth metal salts (ionomers) of the aforementioned unsaturated carboxylic acid graft-modified polyolefins and the aforementioned 1-olefin/unsaturated carboxylic acid copolymers.

Either crystalline homopolymers or crystalline copolymers can be used as the backbone polymers for manufacturing the aforementioned dicarboxylic acid graft-modified polyolefins and unsaturated carboxylic acid graft-modified polyolefins.

In-addition, 1-olefins of 1 to 6 carbon atoms, such as ethylene, propylene, 1-butene and 4-methyl-1-pentene, can be exemplified as monomers used for preparing such backbone polymers. These olefin monomers may be used individually or in combinations. Ethylene and propylene can be cited as monomers particularly preferred as such 1-olefins, however, backbone polymers obtained using 4-methyl-1-pentene are sometimes suitable for applications in which the emphasis is on heat resistance.

The backbone polymer can also be an amorphous copolymer (elastomer) such as an ethylene-propylene amorphous copolymer, ethylene-1-butene amorphous copolymer, or ethylene-4-methyl-1-pentene amorphous copolymer.

The monomers used for modifying such backbone polymers to prepare dicarboxylic acid graft-modified polyolefins or unsaturated carboxylic acid graft-modified polyolefins include aliphatic dicarboxylic acids, such as maleic acid and norbornene dicarboxylic acids, and acid anhydrides thereof; unsaturated dicarboxylic acids, such as tetrahydrophthalic acid, and acid anhydrides thereof; and unsaturated monocarboxylic acids such as (meth)acrylic acid. These monomers can be used individually or in combination. As the dicarboxylic acid graft-modified polyolefin obtained using these monomers, a maleic anhydride graft-modified polyolefin and a maleic anhydride graft-modified low-density polyethylene are most preferably used.

A 1-olefin/unsaturated carboxylic acid copolymer can be prepared using the unsaturated di- or mono-carboxylic acids and 1-olefins of 1 to 6 carbon atoms described above. In such a case, one or more unsaturated carboxylic acids and 1-olefins can be appropriately selected from among the specific examples cited above.

Examples of ionomers include sodium, potassium, calcium, and zinc salts of unsaturated carboxylic acid graft-modified polyolefins and salts of 1-olefin/unsaturated carboxylic acid copolymers such as methacrylic acid graft-modified polyethylenes and ethylene/methacrylic acid copolymers.

The ionomers used in the present invention may contain two or more metal cations in the same polymer. The metal ions can be appropriately selected depending on the intended ionomer application. Sodium ions and potassium ions are commonly preferred.

The adhesive polyolefins described above can be used individually or in combination. It is also possible to use adhesive polyolefin compositions obtained by adding unmodified polyolefins to adhesive polyolefins in amounts that have virtually no adverse effect on the adhesive properties of the adhesive polyolefins.

Among the adhesive polyolefins as described above, ionomers, and adhesive low-density polyethylenes (especially maleic anhydride graft-modified, low-density polyethylenes) are particularly excellent in adhesion to metals.

The collapsible tube 1 of the present embodiment is composed of a thermoplastic resin layer 23 formed as an overcoat layer on the surface of the metal-adhesive thermoplastic resin layer 21 formed as an undercoat layer on the surface of the body portion 3.

The thermoplastic resin used to form the thermoplastic resin layer 23 is not subject to any particular limitations as long as it can adhere to the metal-adhesive thermoplastic resin layer 21. For example, it is possible to employ backbone polymers used in the preparation of the aforementioned graft-modified polyolefins.

In the resin film 9 with such a layer structure, the metal-adhesive thermoplastic resin layer 21 in particular, is formed by spray-coating a dispersion of fine spherical particles of a metal-adhesive thermoplastic resin, and then heat-fusing the particles.

It is preferable for the fine spherical particles of a metal-adhesive thermoplastic resin to be highly spherical and to have a uniform particle diameter.

Figure 7:
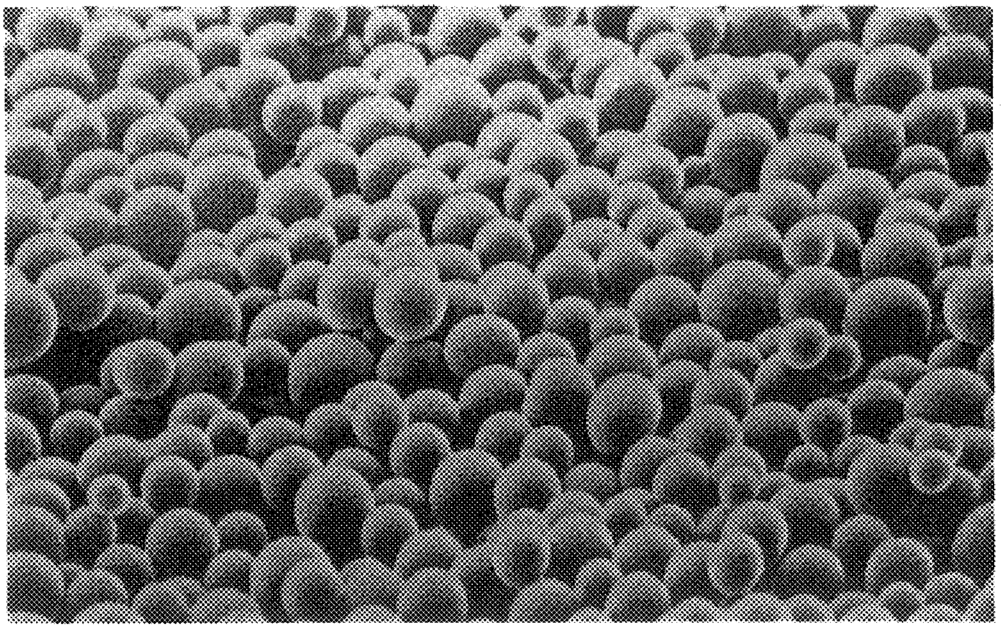
FIG. 7 is a photomicrograph of a group of fine spherical particles of uniform diameter that are the most suitable for forming the metal-adhesive thermoplastic resin layer of the present invention.

FIG. 7 is a photomicrograph of fine spherical particles having a uniform diameter and made of an adhesive thermoplastic resin suitable for the formation of a metal-adhesive thermoplastic resin layer. It can be seen that all the particles are spheres or slightly elongated spheres (ellipsoids) and that the particle diameters are highly uniform. Specifically, only a few of the particles depicted in FIG. 7 have significantly smaller diameters. Completely absent are indented portions or sharp portions such as edges or apices.

The dispersion used in the present invention is obtained by the stable dispersion of such fine spherical particles in water or another appropriate dispersion medium. Dispersions of such fine spherical particles are commercially available. Suitable dispersions can be selected in an appropriate manner and used in accordance with the intended applications. An example is an aqueous dispersion of fine spherical particles of an ionomer resin marketed under the trade name "Chemipearl" by Mitsui Petrochemical Industries, Ltd.

A preferred method for manufacturing a collapsible tube including a process for forming the resin film 9 using such a dispersion of fine spherical particles will now be described with reference to drawings.

Figure 3:
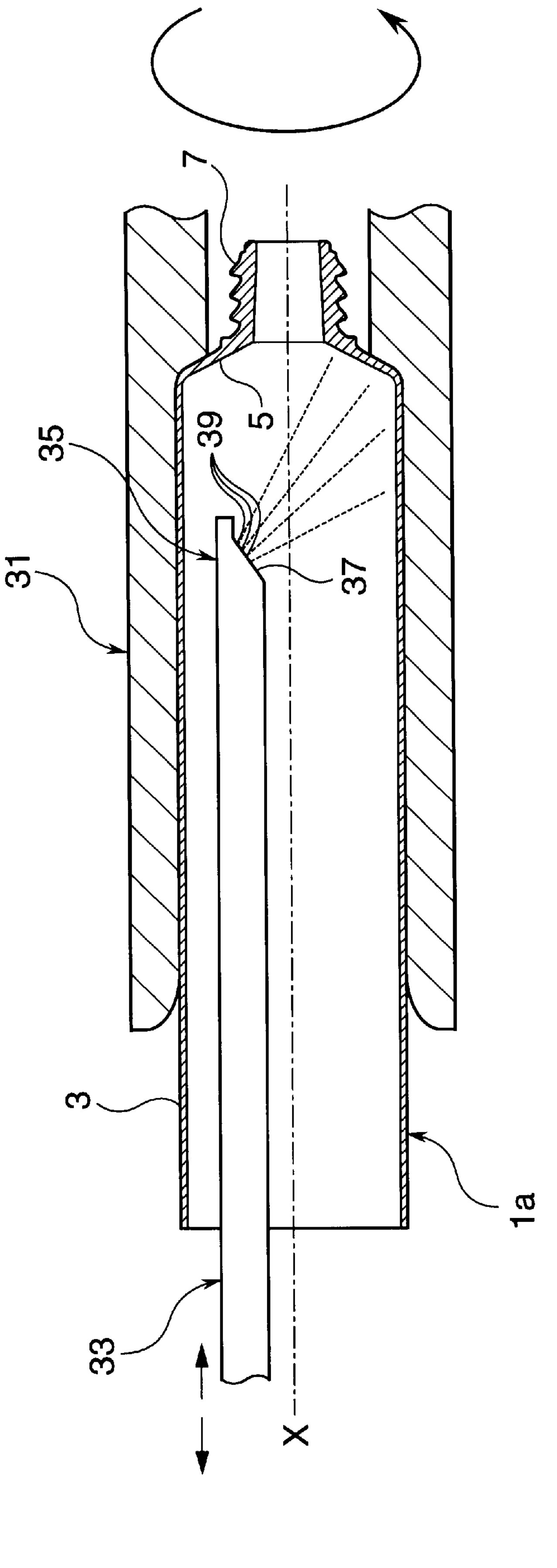
FIG. 3 is a schematic cross section illustrating the method for coating the collapsible tube according to the present invention.

FIG. 3 is a schematic structural view of an apparatus for applying the dispersion to the inside wall surface of the collapsible tube. In FIG. 3, 1*a* indicates an aluminum tube (workpiece) in which a shoulder portion 5 and a mouth/neck portion 7 are connected to one of the ends of a body portion 3 of which the other end is open.

The aluminum tube 1*a* is placed inside a tubular holder 31 with facing its head to the bottom of the holder and is rotated at a prescribed speed by a drive mechanism (not shown) on the major axis X thereof while supported inside the holder 31. A bar-shaped spray gun nozzle 33 roughly parallel to the axis X, which can move back and forth along the axis X by a drive mechanism (not shown) is inserted into the aluminum tube 1*a*. A conduit (not shown) for feeding the dispersion is installed inside the spray gun nozzle 33, the tip 35 of the nozzle is shaped as a flat surface 37 inclined with respect to the major axis X at an intersection angle (θ) of 25 to 60 degrees, and a plurality of spray holes 39 are formed in the flat surface.

During the application of a dispersion of fine resin particles with the aid of such an apparatus, the nozzle 33 moves along the major axis of the aluminum tube while the dispersion, which is fed from a dispersion storage tank (not shown), is sprayed from the spray orifices 39. The dispersion sprayed from the spray orifices 39 is controlled by the intersection angle of the flat surface 37 and is sprayed radially at an incline (intersection angle (θ): 25 to 60 degrees) with respect to the axis X. As the nozzle moves, the aluminum tube 1*a* rotates about the axis X while held in the holder 31, with the result that the dispersion of fine resin particles of a metal-adhesive thermoplastic resin is uniformly applied to the inside wall surface of the aluminum tube 1*a*.

A dense resin layer, that is, a metal-adhesive thermoplastic resin layer 21, is formed by first vaporizing the dispersion medium of the coating formed in such a manner from the dispersion of fine resin particles and then melting to fuse the remaining fine resin particles with heat at a prescribed temperature.

The thickness of the metal-adhesive thermoplastic resin layer 21 can be suitably selected by varying the concentration of the fine particles in the dispersion of fine resin particles or reapplying the dispersion of fine resin particles by, for example, repeating the coating-formation process, repeating the process that precedes the vaporization of the dispersion medium, or repeating the process that precedes the heating and fusion of the fine resin particles. Consequently, a thick metal-adhesive thermoplastic resin layer 21 can be prepared, for example, by performing numerous reapplication cycles or by employing a particularly high-concentration dispersion.

Advantages of thermoplastic resins include the ability to form thick resin films and less to be cracked than in films composed of thermosetting resins. Normally, the upper thickness limit of the metal-adhesive thermoplastic resin layer can be increased to about 250 μm, depending on the spray-coating apparatus of the present invention. For example, using a supercritical carbon dioxide or the like as the dispersion medium makes it possible to markedly accelerate the vaporization of the medium and to achieve a film thickness well in excess of 250 μm while maintaining the required productivity. Using a graft-modified polyolefin in which the backbone polymer is an elastomer as the metal-adhesive thermoplastic resin has the particular advantage of reducing the likelihood of cracking or the like when the thickness of the metal-adhesive thermoplastic resin layer is increased.

In the embodiment shown in FIG. 1B, the thermoplastic resin layer 23 provided on the surface of the metal-adhesive thermoplastic resin layer 21 thus formed can be obtained by any conventional method, and can be formed by the same method as that described above by employing fine particles of a thermoplastic resin.

No particular restrictions are imposed on the thickness of the entire film or on the thickness of each layer in-the resin film 9 thus formed. However, the metal-adhesive thermoplastic resin layer 21 (undercoat layer) generally has an average thickness of 5 to 100 μm, preferably 5 to 20 μm; and the thermoplastic resin layer 23 (overcoat layer) has an average thickness of generally 5 to 150 μm, and preferably 5 to 50 μm. The thickness of the entire film may be 10 μm or greater, and preferably 10 to 250 μm.

The resin film 9 is a dense or close film that is a protective layer having an average pinhole degree (based on a thickness of 30 μm) of 50 mA or less, an elongation at break of 200% or greater, and a crack formation rate of 0, as determined by crusher tests defined later.

As used herein, the term "dense or close film" refers to a film for which the pinhole degree (based on a thickness of 30 μm ), that is, the value (electric current value) measured by the technique described below, is 50 mA or less, preferably 30 mA, and more preferably 20 mA or less. In addition, the pinhole degree (based on a thickness of 30 μm ) is inversely correlated with the film thickness (layer thickness), so the pinhole degree (based on a thickness of 30 μm ) of the present invention is the numerical value that corresponds to a case in which the average layer thickness is set to 30 μm.

It is also possible for the resin film 9 to have a crack generation rate of 0, as determined by crusher tests. As used herein, the term "a crack formation rate of 0" refers to the zero level (statistical level) attainable by a commercial technology. Although it is a very low formation rate, it is not zero in the mathematical (logical) sense.

A shoulder portion 5 and a mouth/neck portion 7 of the aluminum tube 1*a* provided with the resin film 9 as described above are attached to the cap 15, and the contents are packed through the open end. The open end is then folded and tightened, and the resin film 9 (thermoplastic resin layer) is heat-sealed as needed, yielding a collapsible tube 1.

A preferred embodiment of the collapsible metal tube according to the present invention; and a method and apparatus for manufacturing such a tube were described above with reference to FIGS. 1A, 1B, and 3, but it is not implied that the present invention is limited to this embodiment. Specifically, any other layer structure can be used for the resin film of the collapsible metal tube according to the present invention as long as there is at least one metal-adhesive thermoplastic resin layer.

For example, FIG. 1C is a schematic cross section depicting another embodiment of the resin film for the collapsible metal tube according to the present invention. The resin film 9 comprises two metal adhesive layers, that is, a metal-adhesive thermoplastic resin layer 41 composed of an adhesive low-density polyethylene and formed on the surface of the aluminum body portion 3, and a metal-adhesive thermoplastic resin 43 composed of an ionomer-based resin and formed on the surface of the metal-adhesive thermoplastic resin layer 41. At least one of the metal-adhesive thermoplastic resin layers 41 and 43 in the embodiment of the resin film 9 having such a layer structure is formed by the above-described method using a dispersion of fine resin particles.

The resin film 9 thus obtained preferably has the same film thickness, overcoat layer thickness, and undercoat layer thickness as in the embodiment described above, making it possible to expect that the same pinhole degree and crusher test characteristics as in the above-described embodiment will be obtained.

In addition, after the resin film 9 has been formed, the cap 15 is attached in the same manner as in the above-described embodiment, the contents are filled through the open end, the open end is then folded and tightened, and the resin film 9 (thermoplastic resin layer) is heat-sealed as needed, making it possible to obtain a collapsible tube 1.

Figures 2A, 2B:
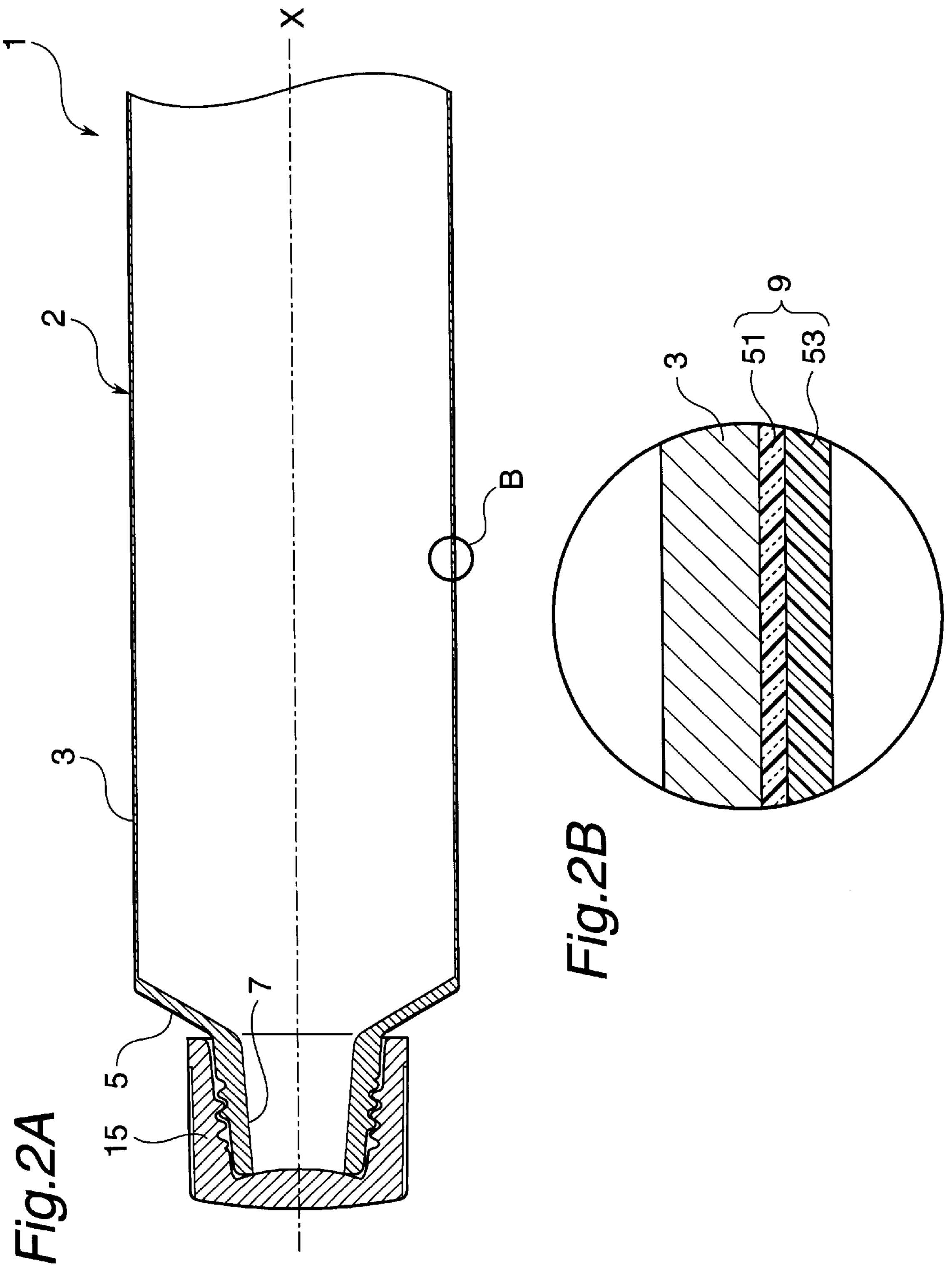
FIG. 2A is a schematic cross section depicting yet another embodiment of the tube of the present invention.
FIG. 2B is a partially enlarged cross section depicting the layer structure of the resin film thereof.

FIGS. 2A and 2B are diagrams depicting yet another embodiment of the collapsible metal tube according to the present invention. As shown in the diagrams, the collapsible tube 31 of the present embodiment has the same structure as in the first embodiment, and identical components are assigned to the same symbols. As is also shown in FIG. 2B, the resin film 9 formed on the inside wall surface of the body portion 3 of the collapsible tube 31 comprises a thermosetting resin layer 51 (undercoat layer) and a metal-adhesive thermoplastic resin layer 53 (overcoat layer) formed on the surface of the thermosetting resin layer 51.

Any thermosetting resin used in the prior art for the manufacturing the collapsible metal tube 1 can be used to form the thermosetting resin layer 51, which is a component of the resin film 9. The thermosetting resin includes epoxy resins and phenolic resins. More concretely, examples of such thermosetting resins include epoxy/phenolic resins and phenol/butyral resins.

The thermosetting resin layer 51 (undercoat layer or primer coat), which is composed of such a thermosetting resin, can be formed by any conventional method. An example is a method in which a coating material in the form of a solution or dispersion containing an uncured thermosetting resin is applied by spraying to an aluminum tube, and the resulting coating is heated and cured.

In addition, when such a coating is being formed, the coating material should preferably be applied in two or more cycles until the coating reaches a prescribed thickness. These application cycles are commonly alternated with drying cycles. Specifically, it is common, for example, that the solvent or dispersion medium, of the coating material (coating agent) is vaporized and removed (subjected to intermediate drying) after the first application cycle has been completed. Removal by vaporization can sometimes be skipped with in the case of using a coating material which is composed of a liquid prepolymer producing no by-products such as gases or liquids during curing.

Such repeated application can effectively prevent the drooping (commonly referred to as sagging) of the coating material and the generation of pinholes. Specifically, when the prescribed layer thickness is about 17 to 18 μm and this thickness is achieved in a single application cycle, the result is often that the coating material sags, the coating undergoes waveform deformation, and the prescribed coating thickness can be achieved only partially. Such sagging is prevented effectively by performing a plurality of application cycles and intervening drying steps.

In addition, the probability that pinholes in the coating still remain is at a maximum when the coating has a single layer, and the generation ratio of pinholes remained in the ultimately obtained coating can be reduced by the repeated application (reapplication) of the coating until the prescribed thickness is attained. However, cracking is apt to occur in a coating obtained from a thermosetting resin, that is, in a thermosetting resin layer with a combined thickness of about 15 μm or greater, so this combined thickness, even when achieved by reapplication, is adopted as the upper limit.

The coating is cured (baked) after being formed in the manner as above. When an epoxy-based coating material is used, it is sufficient for the curing operation to be commonly performed at a temperature (curing temperature) of about 250° C. for 5 to 10 minutes. In addition, when a phenolic coating material is used, the curing operation can normally be performed at a temperature of about 180° C. for about the same time period as described above. It is sufficient for the intermediate drying that accompanies repeated application during the formation of the aforementioned coating to be conducted not as a baking step but as a process carried out at a temperature of about 100° C. for 3 to 5 minutes.

In the embodiment described here, a metal-adhesive thermoplastic resin layer 53 is formed on the surface of the thermosetting resin layer 51 thus formed.

In the resin film 9 according to the present embodiment having such a layer structure, the metal-adhesive thermoplastic resin layer 53 is also formed by the above-described method using a dispersion of fine resin particles.

The resin film 9 thus obtained may have the same film thickness, overcoat layer thickness, and undercoat layer thickness as in the embodiment described above, making it possible to expect that the same pinhole degree and crusher test characteristics as in the above-described embodiment will be obtained.

In addition, after the resin film 9 has been formed, a cap 15 is attached in the same manner as in the above-described embodiment, the contents are filled through the open end, the open end is then folded and tightened, and the resin film 9 (thermoplastic resin layer) is heat-sealed as needed, making it possible to obtain a collapsible tube 1.

In the collapsible metal tube of the present embodiment, the thermosetting resin layer 51 (undercoat layer) and the metal-adhesive thermoplastic resin layer 53 (overcoat layer) can both be formed from materials that have virtually no adhesive power therebetween.

The following advantages are possessed by a resin film composed of the thermosetting resin layer 51 and the metal-adhesive thermoplastic resin layer 53 formed respectively from materials having no adhesion therebetween.

1) A comparatively weak force is sufficient for folding. The reason is that because the overcoat layer and the undercoat layer are separated, the two layers do not function as a single thick layer.

2) The coating hardly cracks when the collapsible tube is folded. The reason is that the readily expandable adhesive thermoplastic resin is located on the innermost side (overcoat film).

3) Although the structure appears to be similar to that of the double-tube collapsible.tube mentioned in connection with prior art, this structure can be manufactured with a much higher productivity than before.

4) When heat-sealing of the tube during the folding and tightening of the end portions is conducted, the metal-adhesive thermoplastic resin is fused, but the thermosetting resin layer fails to seal. Consequently, when drugs, cosmetics, and other materials stored in the tube contain substances, such as alcohol, capable of permeating through the metal-adhesive thermoplastic resin layer, the substances having passed through the metal-adhesive thermoplastic resin layer can first turn into gases between the layers and then escape outside through the folded and tightened end portions.

Next, the metal aerosol can according to the present invention comprises a metal can main body, a resin film having a metal-adhesive thermoplastic resin layer formed by a specific method on the inside wall surface of the body portion of this main body, and a valve assembly mounted on the mouth/neck portion of the can main body. A preferred embodiment of the metal aerosol can of the present invention will now be described with reference to the accompanying drawings.

Figure 4A:
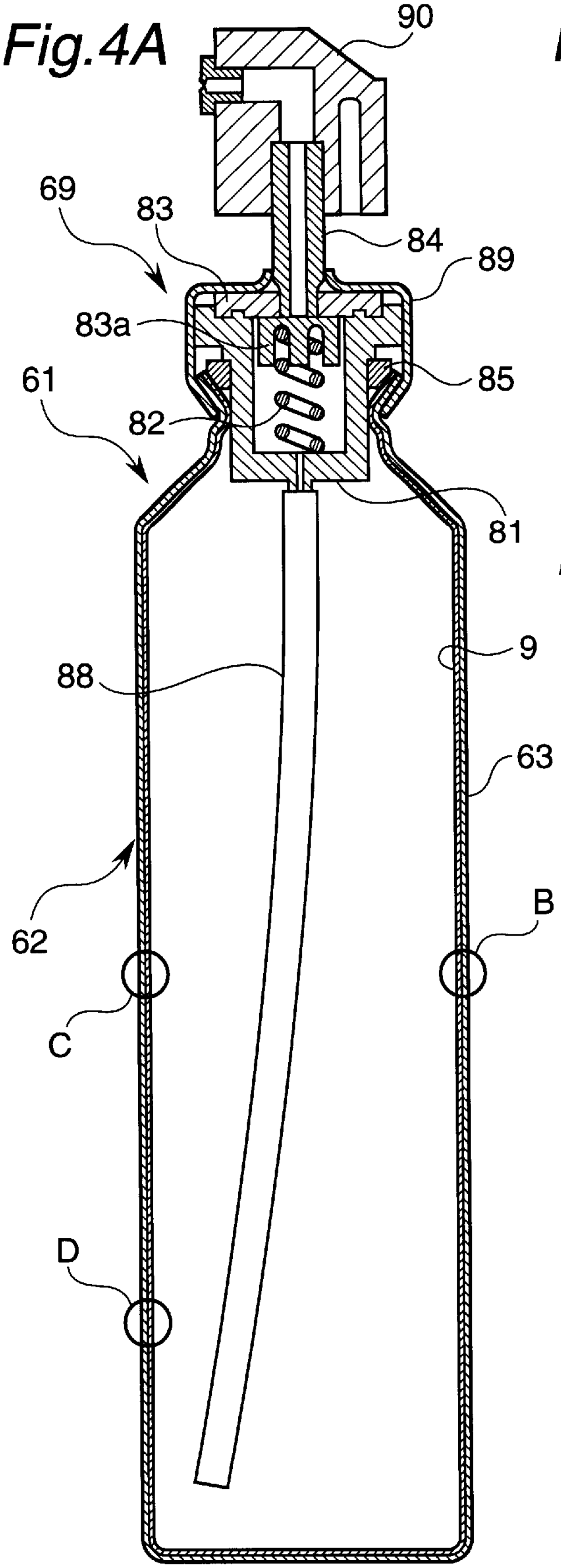
FIG. 4A is a schematic longitudinal section depicting a preferred embodiment of the metal aerosol can according to the present invention.
Figure 4B:
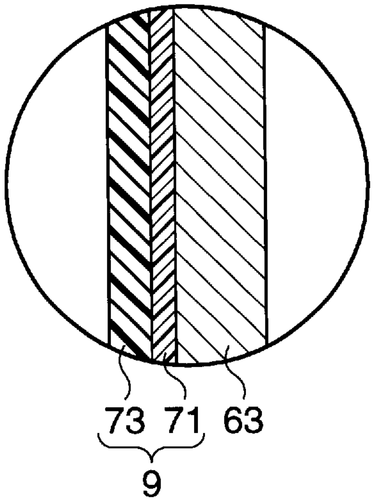
FIG. 4B is a partially enlarged cross section depicting the layer structure of the resin film thereof.
Figure 5:
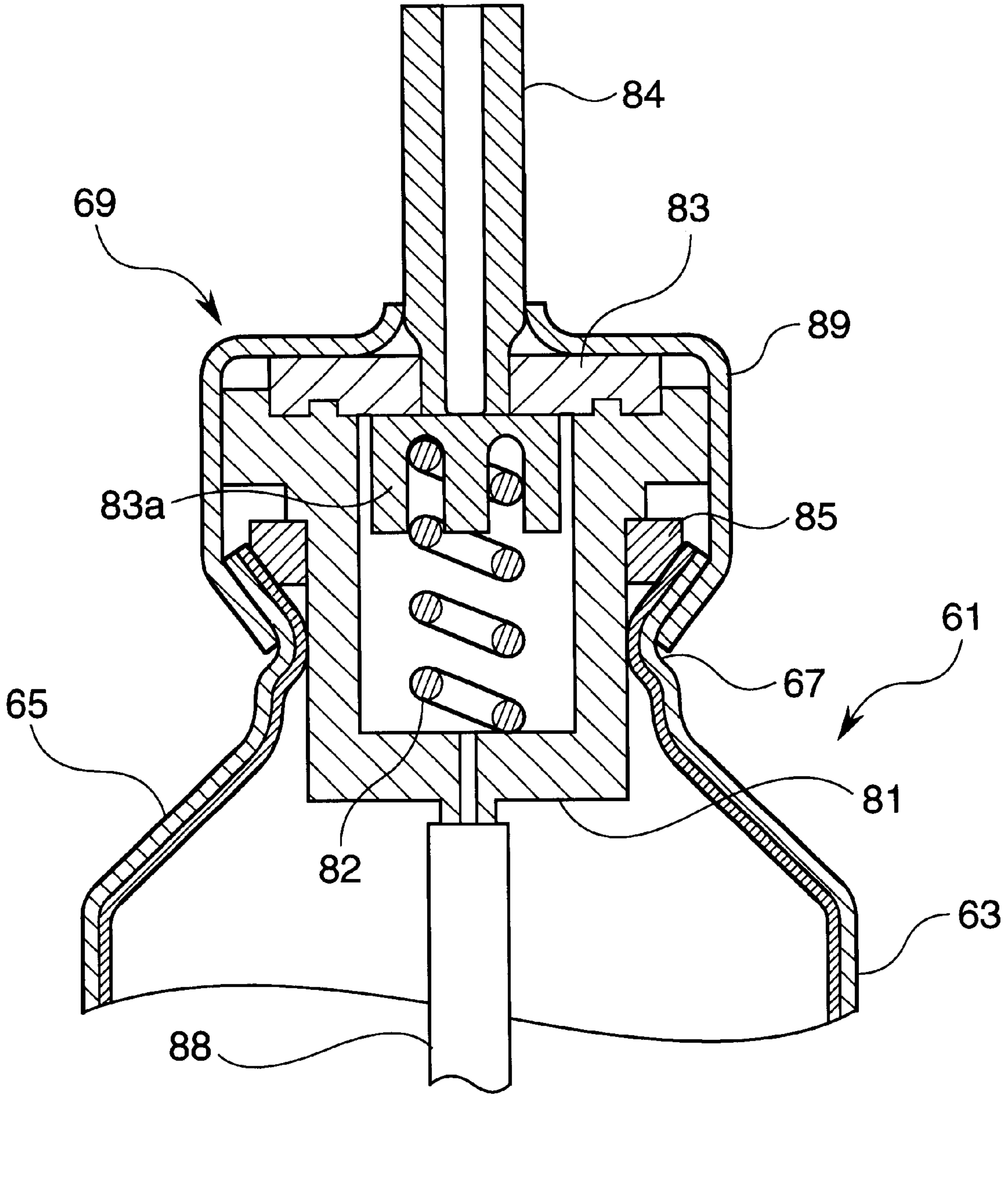
FIG. 5 is a partially enlarged cross section depicting the structure of the valve assembly of the aerosol can in the embodiment according to the present invention.

FIG. 4A is a schematic longitudinal section depicting a preferred embodiment of the metal aerosol can according to the present invention, FIG. 4B is a partially enlarged schematic depicting the resin film layer structure of the aerosol can of the present embodiment, and FIG. 5 is an enlarged cross section of an upper portion of an aerosol can equipped with a valve assembly. As indicated in the drawings, the aerosol can 61, which comprises a metal can main body 62 and a valve assembly 69, is a container for spraying a solution, a suspension or the like through the valve assembly 69 by the pressure of a pressurized gas or other propellant stored-in the can.

The can main body 62 of the aerosol can 61 comprises a bottomed cylindrical metal body portion 63, and a shoulder portion 65 and a mouth/neck portion 67 connected to the tip of the body portion, in which a resin film 9 is formed on the inside wall surface of the body portion 63, and a valve assembly 69 is attached to the mouth/neck portion 67.

The valve assembly 69, which has a conventional structure, comprises a valve housing 81, a spring 82 that is accommodated by the valve housing 81 and that pushes a valve 83*a* upward, a stem rubber 83 for sealing the valve housing, and a stem 84 that passes through the stem rubber 83 and is connected by its lower end to the valve 83*a*. A dip tube 88 is attached to the lower end of the valve housing 81, and the housing is inserted into the mouth/neck portion 67 through the agency of an interlying packing 85 placed around the outside of the housing. The valve assembly 69 is fixed in this state in the mouth/neck portion 67 by caulking the lower end of a cap-shaped metal cover 89 from the outside of the mouth/neck portion 67. The metal cover 89 accommodates the valve housing 81 and the stem rubber 83, and the bottom portion of the cover passes through the stem 84. In addition, a spray head 90 is attached to the upper end of the stem 84.

The metal main body 62 of such an aerosol can is obtained by integrating the body portion 63, the shoulder portion 65, and the mouth/neck portion 67 with the aid of an aluminum plate, aluminum alloy plate, tinned steel plate, or other metal plate inclusive of pulltruded tubes from ingots.

In the aerosol can 61 of the present embodiment, the resin film 9 formed on the inside of the metal body portion 63 comprises a metal-adhesive thermoplastic resin layer 71 (undercoat layer) in contact with the body portion 63 and a thermoplastic resin layer 73 (overcoat layer) that is formed on the outside of undercoat layer and that is capable of adhering under heat to the adhesive thermoplastic resin layer 71, particularly as shown in FIG. 4B.

As the adhesive thermoplastic resins used to form the metal-adhesive thermoplastic resin layer 71 constituting the resin film 9, metal-adhesive polyolefins described as the materials for the metal-adhesive thermoplastic resin layer with reference to the above-described first embodiment of the collapsible tube of the present invention can be cited. Of these resins, ionomers and adhesive low-density polyethylenes (especially maleic anhydride graft-modified low-density polyethylenes), can be cited as preferred examples.

A thermoplastic resin layer 73 is formed as an overcoat layer on the surface of the metal-adhesive thermoplastic resin layer 71 formed as an undercoat layer on the inside wall surface of the body portion 63 in the aerosol can 61 of the present embodiment.

The thermoplastic resin used to form the thermoplastic resin layer 73 is not subject to any particular limitations as long as this resin can be bonded to the metal-adhesive thermoplastic resin layer 71. It is possible, for example, to use backbone polymers commonly employed in the preparation of the aforementioned graft-modified polyolefins. In the resin film 9 having such a layer structure, the metal-adhesive thermoplastic resin layer 71 is formed by spray-coating a dispersion of fine spherical particles of a metal-adhesive thermoplastic resin and then heating to fuse these particles.

It is preferable for the fine spherical particles of the metal-adhesive thermoplastic resin to have a uniform particle diameter and a high degree of sphericity, as described above.

As described above, the dispersions used in the present invention are commercially available. Suitable dispersions can be selected from among the commercially available products in an appropriate manner and used in accordance with intended applications. Examples are fine spherical particles of an ionomer resin marketed under the trade name "Chemipearl" by Mitsui Petrochemical Industries, Ltd.

A preferred method for manufacturing an aerosol can including a process for forming the resin film 9 using such fine spherical particles will now be described with reference to drawings.

Figure 6:
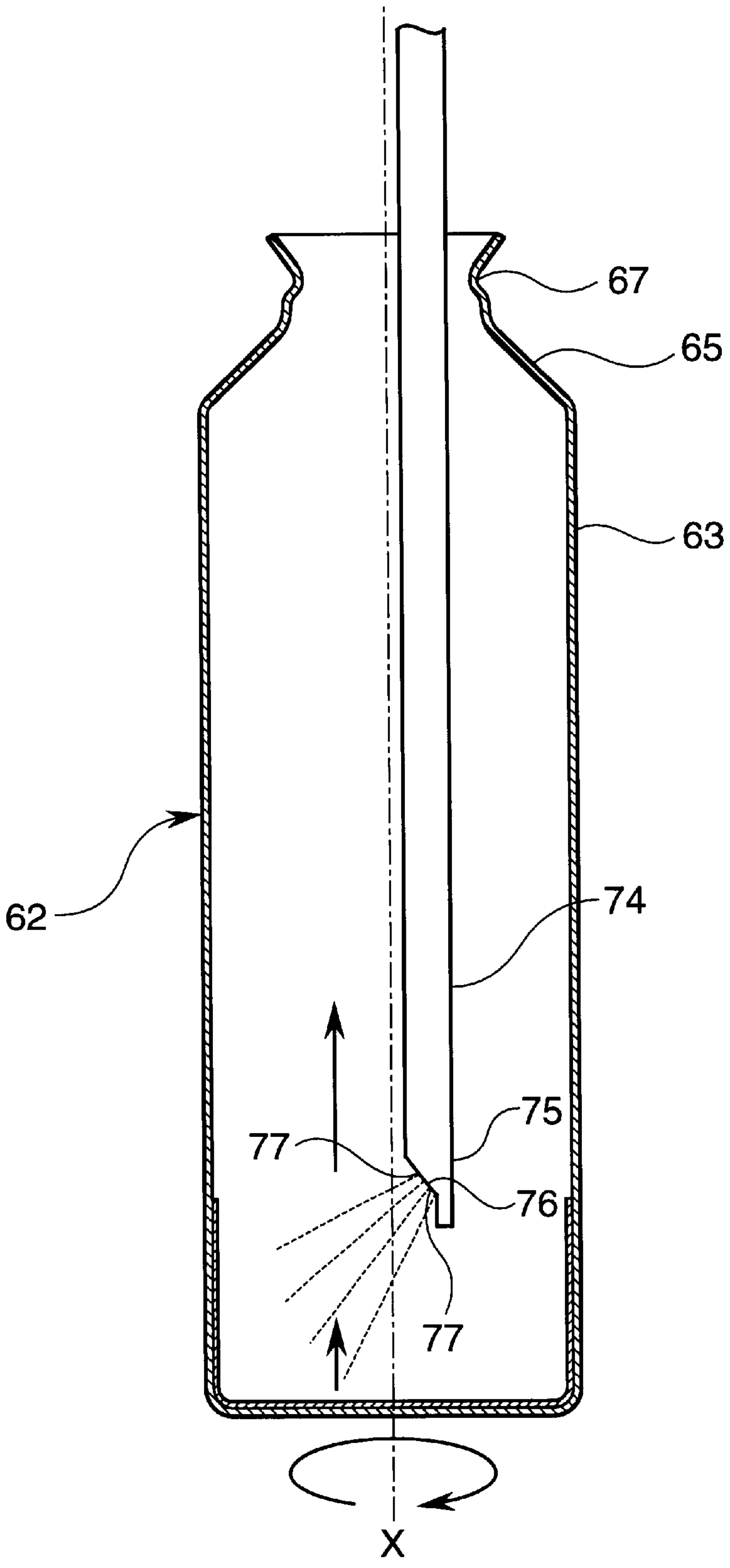
FIG. 6 is a schematic cross section illustrating the method for coating the aerosol can according to the present invention.

FIG. 6 is a schematic structural view of an apparatus for applying the dispersion to the inside wall surface of the can main body. In FIG. 6, 62 is the can main body to be coated. Components identical to those in FIG. 4A are assigned the same symbols and are omitted from the description.

The can main body 62 is held in a rotatable holding attachment (not shown) and is rotated at a prescribed speed by a drive mechanism (not shown) on the major axis X. A bar-shaped spray gun nozzle 74 roughly parallel to the axis X can move back and forth along the axis X by the drive mechanism (not shown), inserted into the can main body 62. A conduit (not shown) for feeding the dispersion is installed inside the spray gun nozzle 74, the tip 75 of the nozzle is shaped as a flat surface 76 inclined with respect to the major axis X at an intersection angle (θ) of 25 to 60 degrees, and spray orifices 77 are formed in the flat surface.

During the application of a dispersion of fine resin particles with the aid of such an apparatus, the nozzle 74 ascends along the major axis of the aluminum tube while the dispersion, which is fed from a dispersion storage tank (not shown), is sprayed from the spray orifices 77. The dispersion sprayed from the spray orifices 77 is controlled by the intersection angle of the flat surface 76 and is sprayed radially at an incline (intersection angle (θ): 25 to 60 degrees) with respect to the axis X. As the nozzle moves, the can main body 62 is rotated around the axis X by the holding attachment, with the result that the dispersion of fine resin particles of a metal-adhesive thermoplastic resin is uniformly applied to the inside wall surface of the can main body 62.

A dense resin layer, that is, a metal-adhesive thermoplastic resin layer 71, is formed by first vaporizing the dispersion medium of the coating formed in such a manner from the dispersion of fine resin particles and then melting and bonding the remaining fine resin particles by heating them to a prescribed temperature.

As described above, the thickness of the metal-adhesive thermoplastic resin layer 71 can be suitably selected by varying the concentration of the fine particles in the dispersion of fine resin particles, reapplying the dispersion, or the like. For example, a thick metal-adhesive thermoplastic resin layer 71 can be obtained by performing numerous application cycles or by employing a particularly high-concentration dispersion.

A thick thermoplastic resin layer can be formed by such a method, and the thickness can commonly be increased to about 250 μm. For example, using a supercritical carbon dioxide or the like as the dispersion medium makes it possible to markedly accelerate the vaporization of the medium and to achieve a film thickness well in excess of 250 μm while maintaining the required productivity. In addition, using a graft-modified polyolefin in which the backbone polymer is an elastomer as the metal-adhesive thermoplastic resin is advantageous in terms of reducing the likelihood of cracking or the like when the thickness of the metal-adhesive thermoplastic resin layer is increased.

In the embodiment shown in FIG. 4B, the thermoplastic resin layer 73 provided on the surface of the metal-adhesive thermoplastic resin layer 71 thus formed can be obtained by any conventional method, and can be formed by the same method as that described above by employing fine particles of a thermoplastic resin.

No particular restrictions are imposed on the thickness of the entire film or on the thickness of each layer in the resin film 9 thus formed. The metal-adhesive thermoplastic resin layer 71 (undercoat layer) has an average thickness of generally 5 to 100 μm, and preferably 5 to 20 μm; and the thermoplastic resin layer 73 (overcoat layer) has an average thickness of generally 5 to 150 μm, and preferably 5 to 100 μm. The entire thickness of the film may be set to 10 μm or greater, preferably to between 10 and 250 μm.

The resin film 9 is a dense or close film whose average pinhole degree (based on a thickness of 30 μm) is 50 mA or less.

In the can main body 62 provided with the resin film 9 as described above, a valve assembly 69 is fixed in the mouth/neck portion 67 as described above, and a liquid drug or cosmetic is pumped inside together with a pressurized gas (liquefied gas) or other propellant, yielding an aerosol can 61.

A preferred embodiment of the metal aerosol can according to the present invention, and a method and apparatus for manufacturing such a tube were described above with reference to FIGS. 4A, 4B, and 6, but it is not implied that the present invention is limited to this embodiment. As a specific example, any other layer structure can be used for the resin film of the metal aerosol can according to the present invention as long as there is at least one metal-adhesive thermoplastic resin layer.

Figure 4C:
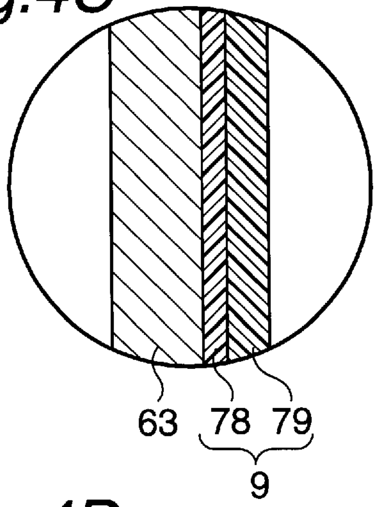
FIG. 4C is a partially enlarged cross section depicting another preferred embodiment of the layer structure of the resin film.

For example, FIG. 4C is a schematic cross section depicting another embodiment of the resin film for the metal aerosol can according to the present invention. The resin film 9 comprises two metal adhesive layers, that is, a metal-adhesive thermoplastic resin layer 78 composed of an adhesive low-density polyethylene and formed on the inside wall surface of the body portion 63 of the can main body 62, and a metal-adhesive thermoplastic resin 79 composed of an ionomer-based resin and formed on the surface of the metal-adhesive thermoplastic resin layer 78. At least one of the metal-adhesive thermoplastic resin layers 78 and 79 in the embodiment of the resin film 9 having such a layer structure is formed by the above-described method using a dispersion of fine resin particles.

The resin film 9 thus obtained preferably has the same film thickness, overcoat layer thickness, and undercoat layer thickness as in the embodiment described above, making it possible to expect that the same pinhole degree as in the above-described embodiment will be obtained.

Figure 4D:
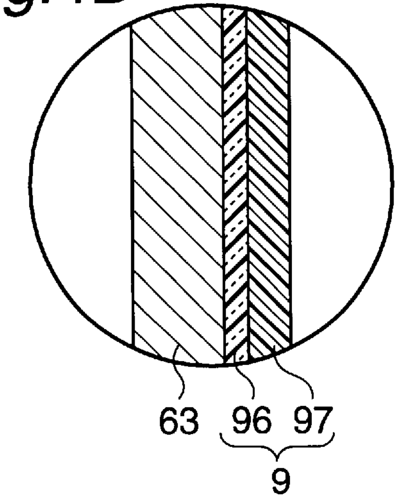
FIG. 4D is a partially enlarged cross section depicting yet another embodiment of the layer structure of the resin film.

FIG. 4D is a schematic cross section depicting yet another embodiment of the resin film of the metal aerosol can pertaining to the present invention. The resin film 9 comprises a thermosetting resin layer 96 formed on the inside wall surface of the body portion 63 of the can main body 62, and a metal-adhesive thermoplastic resin layer 97 formed on the surface of the thermosetting resin layer 96.

For example, epoxy resins and phenolic resins can be used as the-thermosetting resins for forming the thermosetting resin layer 96, which is a component of the resin film 9. More concretely, examples of such thermosetting resins include epoxy/phenolic resins and phenol/butyral resins.

The thermosetting resin layer 96 composed of such a thermosetting resin can be-formed by any conventional method. For example, the layer may be formed by the method described with reference to the third embodiment of the layer structure for the resin film 9 of the collapsible metal tube 1 described above.

In the present embodiment, the metal-adhesive thermoplastic resin layer 97 formed on the surface of the thermosetting resin layer 96 thus obtained can be formed by the above-described method using a dispersion of fine resin particles.

The resin film 9 preferably has the same film thickness, overcoat layer thickness, and undercoat layer thickness as in the first embodiment, making it possible to expect that the same pinhole degree as in the embodiment described above will be obtained.

When a liquid (for example, a dispersion obtained by dispersing a strongly acidic aqueous solution in an organic dispersion medium) prone to attacking the thermosetting resin in the metal aerosol can 1 of such an embodiment is introduced into the can, the reliability of the resin film can be further improved because the thermosetting resin layer 96 can be protected by the metal-adhesive thermoplastic resin layer 97, for example, of an ionomer which remains stable over a long period of time against such a liquid.

The resin film 9 thus obtained preferably has the same film thickness, overcoat layer thickness, and undercoat layer thickness as in the embodiment described above, making it possible to expect that the same pinhole degree as in the embodiment described above will be obtained.

In the can main body 62 provided with the resin film 9 of the embodiment shown in FIGS. 4C and 4D above, a valve assembly 69 is also mounted and fixed on the mouth/neck portion 67 as described above, and a liquid drug or cosmetic is pumped inside together with a pressurized gas (liquefied gas) or other propellant, yielding an aerosol can 61.

EFFECT OF THE INVENTION

According to the collapsible metal tube and manufacturing method of the present invention as described above, since a resin film that has a metal-adhesive thermoplastic resin layer formed by spray-coating the inside wall surface of the body portion with a dispersion of fine spherical particles composed of a metal-adhesive thermoplastic resin and then heating and fusing these particles is formed, it is possible to provide a collapsible metal tube covered on the inside with a resin film that is reliable because it is a dense resin film virtually devoid of pinholes, excellent in elongation at break, and free from cracking when folded or deformed, and that is capable of protecting the metal body portion and the contents.

According to the metal aerosol can and manufacturing method of the present invention, since a resin film that has a metal-adhesive thermoplastic resin layer, itself formed by first spray-coating the inside wall surface of the body portion with a dispersion of fine spherical particles of a metal-adhesive thermoplastic resin and then heating and fusing to integrate these particles, it possible to offer an aerosol can covered on the inside with a dense resin film virtually devoid of pinholes and that is capable of protecting the metal body portion and the contents.

EXAMPLE

The following methods and criteria were used to measure and evaluate the effects of the present invention.

(1) Resin film thickness: 25 μm

Measuring instrument

Strand gage (trade name: "Strand Gage" (manufactured by Strand Gage Electronics))

Measurement procedure

A test piece was mounted between the measuring terminals of the instrument, the measured electrical conductivity was converted to the characteristic electric current, and the resulting value was used to estimate the resin film thickness.

Test piece 150 mm (length)×75 mm (width)×0.11 mm (thickness)

Preparation conditions

27° C. (temperature)×65% RH (relative humidity)×1 hour

Measurement conditions

25° C. (temperature)×60% RH (relative humidity)×2 hours (time); six measurement cycles; the arithmetic mean thereof was adopted as the measured value.

(2) Pinhole degree (based on a thickness of 30 μm )

A cap was placed on-a metal tube sample (coated on the inside), the tube was filled with a highly conductive aqueous solution, one electrode was attached to the outside of the metal tube and another was immersed in the aqueous solution, and the current being passed was measured.

Measurement conditions

Voltage applied: DC 6V

Aqueous solution: Mixed solution of 5% NaCl, 1% $CuSO_4$, and 0.05% $CH_3COOH$ (3) Peeling strength of resin film (interlayer adhesion)

Cross-cut Adhesion Test

Squares measuring 1 mm×1 mm were formed by flattening the surface of a resin film and making 11 longitudinal and 11 transverse cuts at 1-mm intervals. An adhesive tape was adhered on these 100 squares, and the number and distribution of the regions (squares) that had separated when the adhesive tape was rapidly peeled off were measured.

Crusher test

A coated tube was first compressed and then stretched, and the extent to which the tube had cracked, split, or peeled was measured.

Abrasion test

The surface of a resin film was first flattened and then rubbed with gauze impregnated with toluene, and the condition of the coating was evaluated.

Example 1

A high-purity aluminum tube 1 with a preformed shoulder portion and mouth/neck portion of standard dimensions was used as the metal tube, and the tube was inserted into a holder 31 in such a way that the mouth/neck portion faced inward and was fixed by pressing the shoulder portion against the starting point of a tapered area positioned inside. A bar-shaped spray gun nozzle 33 was subsequently inserted into the aluminum tube parallel to the major axis of the tube. The tip of the spray gun had a flat surface 37 that was inclined at an intersection angle of about 45 degrees with respect to the major axis, and the flat surface was provided with spray orifices 39 for discharging a coating material roughly perpendicular to the surface.

An-aqueous dispersion of fine spherical particles having a uniform particle diameter (solids concentration: 28 wt %; pH of aqueous dispersion medium: 10; viscosity: 320 centipoises (cps), average particle diameter of solids: 0.1 mm or less; minimum film-forming temperature: 89° C.) whose particles were made of an ionomer-based resin (density: 0.948 g/cc; tensile strength: 355 kgf/cm$^2$; elongation at break: 360%; Vicat softening point: 60° C.) was sprayed (0.5 to 1.25 g/sec) as an adhesive polyethylene of spherical uniform diameter through the tip of the spray gun nozzle 33 at an angle of about 45 degrees with respect to the inside wall surface of the aluminum tube 1 while the holder 31 was rotated (1750 rpm) around the major axis. In the process, the spray gun nozzle 33 moved (linear velocity: 270 to 340 mm/sec) toward the outlet of the aluminum tube 1.

The aluminum tube 1 coated once on the inside with the dispersion was kept for 3 to 5 minutes at a temperature of 120 to 150° C., yielding a dense undercoat resin layer 21 (average film thickness: 15 μm).

An unmodified low-density polyethylene (MI at 190° C. and 2.16 kgf: 25 g/10 min; density: 0.915 g/cc) was applied to the surface of the undercoat layer as a second film (overcoat) in accordance with the same procedure as above, yielding a film with a combined total thickness of about 32 μm. The aluminum tube 1 was subsequently introduced into a fusion furnace while still in the holder 31. The tube was kept in the fusion furnace for 3 to 5 minutes at a fusion temperature of 150 to 155° C., and the layer of the low-density polyethylene fine particles obtained by coating was melted and integrated with the undercoat layer 21, yielding an overcoat layer (average film thickness: 17 μm).

The aforementioned undercoat layer was coated twice by using the aqueous dispersion of the unmodified low-density polyethylene fine particles by the same procedure as above, the dispersion medium was vaporized off each time at a temperature of 150° C., the product was fused by heat, and the overcoat layer 23 was finished, yielding a resin film with a combined film thickness of 66 μm.

The resulting tube 1 of the present invention underwent various measurements in accordance with the procedures and conditions described above in the section dealing with measuring and evaluating the effects. The following results were obtained.

(1) Film thickness: 66 μm (2) Pinhole degree: 10 mA (66 μm)

(3) Peeling strength of the resin film (interlayer adhesion): 1.25 kgf/15 mm-width (4) Cross-cut adhesion test: Pass (5) Crusher test: Pass (6) Abrasion test: Pass Example 2

The same aluminum tube 1 and coating apparatus as in Example 1 were used and a bar-shaped spray gun nozzle 33 was introduced into the aluminum tube 1 parallel to the major axis X of the tube.

An aqueous dispersion of fine spherical particles having a uniform particle diameter (solids concentration: 40 wt %; pH of aqueous dispersion medium: 9; viscosity: 5000 cPs, average particle diameter: 5 μm; minimum film-forming temperature: 106° C.), whose particles were made of an adhesive low-density polyethylene (density: 0.92 g/cc; tensile strength: 83 kgf/cm$^2$; elongation at break: 330%; Vicat softening point: 78° C.) was sprayed (0.65 to 1.62 g/min) as an undercoat material fed from a tank (not shown) while a holder 31 containing the aluminum tube 1 was rotated (1750 rpm) around the major axis by a drive apparatus (not shown). The dispersion was sprayed through the tip of a spray gun nozzle 33 at an angle of about 45 degrees with respect to the inside wall surface of the aluminum tube 1. The spray gun nozzle 33 was moved (linear velocity: 270 to 340 mm/sec) toward the outlet of the aluminum tube 1 by a drive means (not shown).

The aluminum tube 1 coated once on the inside with the dispersion was kept for 2 minutes at a temperature of 150° C., the dispersion medium was subsequently vaporized, the system was gradually heated to a temperature of 195° C. at a rate of 5° C./min, and a dense undercoat layer 41 (average film thickness: 22 μm) was completed while the solids were melted.

The same apparatus as above was used to coat the undercoat layer twice with an aqueous dispersion of an adhesive high-density polyethylene having the properties described below, the system was kept each time for 3 to 5 minutes at a temperature of 120 to 150° C., and the overcoat layer 43 (average film thickness: 30 μm ) was completed, yielding a resin film with a combined film thickness of 52 μm:

Aqueous dispersion of the adhesive low-density polyethylene (solids concentration: 27 wt %; pH of aqueous dispersion: 10; viscosity: 300 cPs; average particle diameter: 0.1 μm or less; genuine density of starting material resin: 0.946 g/cc; tensile strength: 350 kgf/cm$^2$; elongation at break: 360%; Vicat softening point: 60° C.)

The resulting tube of the present invention underwent various measurements in accordance with the procedures and conditions described above in the section dealing with measuring and evaluating the effects. The following results were obtained.

(1) Film thickness: 52 μm (2) Pinhole degree: 17 mA (52 μm)

(3) Peeling strength of the resin film (interlayer adhesion): 1.26 kgf/15 mm-width (4) Cross-cut adhesion test: Pass (5) Crusher test: Pass (6) Abrasion test: Pass Example 3

The same aluminum tube 1 and coating apparatus as in Example 1 were used and a bar-shaped spray gun nozzle 33 was introduced into the aluminum tube 1 parallel to the major axis X of the tube.

An aqueous dispersion of fine spherical particles having a uniform particle diameter (solids concentration: 28 wt %; pH of aqueous dispersion medium: 10; viscosity: 320 cPs, average particle diameter of solids: 0.1 μm or less; minimum film-forming temperature: 89° C.), whose particles were made of an ionomer-based resin (density: 0.948 g/cc; tensile strength: 355 kgf/cm$^2$; elongation at break: 360%; Vicat softening point: 60 ° C.) was sprayed (0.5 to 1.25 g/min) as an adhesive polyethylene of spherical uniform diameter, at an angle of about 45 degrees with respect to the inside wall surface of the aluminum tube 1 while a holder 31 containing the aluminum tube 1 was rotated (1750 rpm) about the major axis by a drive apparatus (not shown). The spray gun nozzle 33 moved (linear velocity: 270 to 340 mm/sec) toward the outlet of the aluminum tube 1. The aluminum tube 1 coated once on the inside with the dispersion was kept for 3 to 5 minutes at a temperature of 120 to 150° C., yielding a dense undercoat layer (average film thickness: 15 μm). The surface of the layer was coated for the second time by reapplying the same aqueous dispersion of fine spherical particles of uniform particle diameter as in the first application in accordance with the same procedure, and the aluminum tube 1 was subsequently introduced into a fusion furnace while still in the holder 31. The tube was kept in the fusion furnace for 3 to 5 minutes at a fusion temperature of 120 to 155° C., and the layer of ionomer fine particles obtained by coating was melted and intimately fused with the undercoat layer, yielding a single-layer resin film with a combined thickness of 30 μm.

The resulting collapsible tube 1 underwent various measurements in accordance with the procedures and conditions described above in the section dealing with measuring and evaluating the effects. The following results were obtained.

(1) Film thickness: 30 μm (2) Pinhole degree (based on a thickness of 30 μm): 47 mA (3) Peeling strength of the resin film (interlayer adhesion): 1.05 kgf/15 mm-width (4) Cross-cut adhesion test: Pass (5) Crusher test: Pass (6) Abrasion test: Pass Example 4

The same aluminum tube 1 and coating apparatus as in Example 1 were used and a bar-shaped spray gun nozzle 33 was introduced into the aluminum tube 1 parallel to the major axis X of the tube.

An epoxy/phenolic coating material (content of epoxy component: 23 wt %; content of phenol component: 10 wt %; trade name: A0N302T-100; manufactured by Tanaka Chemical) was sprayed (0.4 to 1.05 g/min) at an angle of about 45 degrees with respect to the inside wall surface of the aluminum tube 1 through the tip of the collapsible tube 1 while a holder 31 was rotated (1750 rpm) about the major axis. The spray gun nozzle 33 was moved (linear velocity: 270 to 340 mm/sec) toward the outlet of the aluminum tube 1.

The aluminum tube 1 coated once on the inside with the coating material was subjected to intermediate drying for 0.3 to 1.0 minute at a temperature of 90 to 110° C., and the resulting undercoat layer with a thickness of about 7 μm was coated using the aforementioned epoxy-phenolic coating material in accordance with the same procedure, yielding a combined film thickness of up to about 15 μm. The aluminum tube 1 was subsequently introduced into a baking furnace while still in the holder 31. The tube was kept in the baking furnace for 4 to 7 minutes at a baking temperature of 210 to 270° C. to thoroughly cure the heat-curable coating material (epoxy-phenolic resin), yielding an undercoat layer 51 with an average film thickness of 15 μm.

The same apparatus as above was used to coat the undercoat layer 51 twice with an aqueous dispersion of an ionomer having the properties described below, and the system was kept each time for 3 to 5 minutes at a temperature of 120 to 150° C., yielding an overcoat layer 53 (combined film thickness: 30 μm) of an adhesive polyolefin. The sum of the thickness of the thermosetting resin layer 51 and the thickness of the adhesive polyolefin resin layer 53 was 45 μm:

Aqueous dispersion of ionomer (solids concentration: 27 wt %; pH of aqueous dispersion: 10; viscosity: 320 cPs; average particle diameter: 0.1 μm or less; genuine density of starting material resin: 0.95 g/cc; tensile strength: 350 kgf/cm$^2$; elongation at break: 350%; Vicat softening point: 58° C.).

This double-layer collapsible tube was manufactured at a productivity that was about twice as high as that of a conventional collapsible tube.

The resulting collapsible tube 1 underwent various measurements in accordance with the procedures and conditions described above in the section dealing with measuring and evaluating the effects. The following results were obtained.

(1) Film thickness: 15 μm for the undercoat film and 30 μm for the overcoat film (2) Pinhole degree: 22 mA (45 μm)

(3) Peeling strength of the resin film (interlayer adhesion): 0 kgf/15 mm-width (4) Cross-cut adhesion test: Virtually all squares had separated (hardly any adhesiveness was observed between the undercoat layer (96) and overcoat layer (97))

(5) Crusher test: (Interlayer adhesion between the undercoat layer and metal surface was tested) Pass (6) Abrasion test: (Interlayer adhesion between the undercoat layer and metal surface was tested) Pass Example 5

A high-purity aluminum-plate can main body 62 which had the shape shown in FIG. 6 and in which the body portion 63 had a diameter of 25 mm and the wall portion had a thickness of 0.4 mm was fixed in an upright position in a holding attachment (not shown). A bar-shaped spray gun nozzle 74 was subsequently inserted into the can main body parallel to the major axis of the body. The tip 75 of the spray gun nozzle 74 had a flat surface portion 76 fixed at an angle of about 45 degrees with respect to the major axis, and this flat surface 76 was provided with coating material spray orifices 77.

An aqueous dispersion of fine spherical particles having a uniform particle diameter (solids concentration: 28 wt %; pH of aqueous dispersion medium: 10; viscosity: 320 cPs, average particle diameter of solids: 0.1 μm or less; minimum film-forming temperature: 89° C.), whose particles were made of an ionomer-based resin (density: 0.948 g/cc; tensile strength: 355 kgf/cm$^2$; elongation at break: 360%; Vicat softening point: 60 ° C.) was subsequently sprayed (0.9 to 1.6 g/sec) as an adhesive polyethylene of spherical uniform diameter at an angle of about 45 degrees with respect to the inside wall surface of the can main body through the tip of a spray gun nozzle 74 while the can main body 62 was rotated (1750 rpm) by the rotating attachment, while the gun nozzle 74 moved upward (linear velocity: 270 to 340 mm/sec).

The can main body 62 coated once on the inside with the dispersion was kept for 3 to 5 minutes at a temperature of 120 to 150° C., yielding a dense undercoat resin layer 71 (average film thickness: 15 μm).

The surface of the layer was subsequently coated with fine particles of an unmodified low-density polyethylene (MI (190° C., 2.16 kgf) : 25 g/10 min; density: 0.915 g/cc) in accordance with the same procedure as described above in order to form an overcoat layer, and the can main body 62 was introduced into a fusion furnace. The body was kept in the fusion furnace for 3 to 5 minutes at a fusion temperature of 150 to 155° C., and the layer of low-density polyethylene fine particles obtained by coating was melted and integrated with the undercoat layer 71, yielding an overcoat layer 73 (average film thickness: 15 μm).

The aforementioned overcoat layer 73 was coated twice with the unmodified low-density polyethylene fine particles using the same procedure as above, the product was fused by heat each time at a temperature of 150° C., and the overcoat layer was finished, yielding a resin film with a combined film thickness of 50 μm.

The resulting aerosol can underwent various measurements in accordance with the procedures and conditions described above in the section dealing with measuring and evaluating the effects. The following results were obtained.

(1) Film thickness: 50 μm (2) Pinhole degree: 14 mA (50 μm)

(3) Peeling strength of the resin film (interlayer adhesion): 1.23 kgf/15 mm-width (4) Cross-cut adhesion test: Pass (5) Abrasion test: Pass

What is claimed is:

1. A collapsible metal tube, comprising:

a metal body portion susceptible of plastic deformation, said body portion being sealed at one end;

a shoulder portion and a mouth/neck portion connected to the other end of said body portion; and a resin film provided on the inside wall surface of the body portion, said resin film comprising at least one metal-adhesive thermoplastic resin layer formed by spray-coating the inside wall surface of the body portion with a dispersion of fine spherical particles of a metal-adhesive thermoplastic resin and heating to fuse said particles, wherein said metal-adhesive thermoplastic resin layer consists of a metal-adhesive thermoplastic resin selected from the group consisting of dicarboxylic acid graft-modified polyolefins, unsaturated carboxylic acid graft-modified polyolefins, 1-olefin/unsaturated carboxylic acid copolymers, ionomers of unsaturated carboxylic acid graft-modified polyolefins and ionomers of 1-olefin/unsaturated carboxylic acid copolymers, said metal-adhesive thermoplastic resin layer is directly provided on the inside wall surface of the body portion, and said resin film is a protective layer having an average pinhole degree, based on a thickness of 30 $\mu$m, of up to 50 mA.

2. A collapsible metal tube as claimed in claim 1, wherein said resin film comprises more than one said metal-adhesive thermoplastic resin layer.

3. A collapsible metal tube as claimed in claim 1, wherein said resin film comprises said metal-adhesive thermoplastic resin layer and a thermoplastic resin layer capable of adhering to said metal-adhesive thermoplastic resin layer.

4. A collapsible metal tube as claimed in claim 3, wherein said thermoplastic resin layer formed inside of the metal-adhesive thermoplastic resin layer consists of crystalline 1-olefin homopolymer or crystalline 1-olefin copolymer.

5. A collapsible metal tube as claimed in claim 1, wherein said resin film comprises a multi-layered laminate comprising (1) said metal-adhesive thermoplastic resin layer with (2) an unmodified thermoplastic resin layer capable of adhering to said metal-adhesive thermoplastic resin layer.

6. A collapsible metal tube as claimed in claim 5, wherein said unmodified thermoplastic resin layer formed inside of the metal-adhesive thermoplastic resin layer consists of crystalline 1-olefin homopolymer or crystalline 1-olefin copolymer.

7. A collapsible metal tube as claimed in claim 1, wherein said resin film has an average pinhole degree, based on a thickness of 30 $\mu$m, of up to 30 mA.

8. A collapsible metal tube as claimed in claim 1, wherein said resin film has an average pinhole degree, based on a thickness of 30 $\mu$m, of up to 20 mA.

9. A collapsible metal tube, comprising:

a metal body portion susceptible of plastic deformation, said body portion being sealed at one end;

a shoulder portion and a mouth/neck portion connected to the other end of said body portion; and a resin film provided on the inside wall surface of the body portion, said resin film comprising at least one metal-adhesive thermoplastic resin layer formed by spray-coating the inside wall surface of the body portion with a dispersion of fine spherical particles of a metal-adhesive thermoplastic resin and heating to fuse said particles, wherein said metal-adhesive thermoplastic resin layer consists of a metal-adhesive thermoplastic resin selected from the group consisting of dicarboxylic acid graft-modified polyolefins, unsaturated carboxylic acid graft-modified polyolefins, 1-olefin/unsaturated carboxylic acid copolymers, ionomers of unsaturated carboxylic acid graft-modified polyolefins and ionomers of 1-olefin/unsaturated carboxylic acid copolymers, said resin film comprises a thermosetting resin layer in contact with the surface of said metal body portion, and a metal-adhesive thermoplastic resin layer formed on the inside of said thermosetting resin layer, and said resin film is a protective layer having an average pinhole degree, based on a thickness of 30 $\mu$m , of up to 50 mA.

10. A collapsible metal tube as claimed in claim 9, wherein said thermosetting resin layer consists of epoxy resin or phenolic resin.

11. A metal aerosol can, comprising:

a bottomed cylindrical body portion;

a shoulder portion and a mouth/neck portion connected to the other end of said body portion;

a valve assembly provided to said mouth/neck portion; and a resin film provided on the inside wall surface of said body portion, said resin film comprising at least one metal-adhesive thermoplastic resin layer formed by spray-coating the inside wall surface of said body portion with a dispersion of fine spherical particles of a metal-adhesive thermoplastic resin and heating to fuse said particles, wherein said metal-adhesive thermoplastic resin layer consists of a metal-adhesive thermoplastic resin selected from the group consisting of dicarboxylic acid graft-modified polyolefins, unsaturated carboxylic acid graft-modified polyolefins, 1-olefin/unsaturated carboxylic acid copolymers, ionomers of unsaturated carboxylic acid graft-modified polyolefins and ionomers of 1-olefin/unsaturated carboxylic acid copolymers, said metal-adhesive thermoplastic resin layer is directly provided on the inside wall surface of the body portion, and said resin film is a protective layer having an average pinhole degree, based on a thickness of 30 $\mu$m, of up to 50 mA.

12. A collapsible metal tube, comprising a metal body portion susceptible of plastic deformation, said body portion being sealed at one end;

a shoulder portion and a mouth/neck portion connected to the other end of said body portion; and a coating of uniform thickness of fine spherical particles of a metal-adhesive thermoplastic resin on the inside wall surface of the body portion.

13. A collapsible metal tube as claimed in claim 12, wherein said metal-adhesive thermoplastic resin is selected from the group consisting of dicarboxylic acid graft-modified polyolefins, unsaturated carboxylic acid graft-modified polyolefins, 1-olefin/unsaturated carboxylic acid copolymers, ionomers of unsaturated carboxylic acid graft-modified polyolefins and ionomers of 1-olefin/unsaturated carboxylic acid copolymers.

* * * * *